US006973186B2

(12) United States Patent
Shin

(10) Patent No.: US 6,973,186 B2
(45) Date of Patent: Dec. 6, 2005

(54) SLIDE TYPE MOBILE PHONE USING SLIDE MODULE

(75) Inventor: Ji Seop Shin, Namyangju-Si (KR)

(73) Assignee: SK Teletech Co., Ltd., Seoul (KR)

( * ) Notice: Subject to any disclaimer, the term of this patent is extended or adjusted under 35 U.S.C. 154(b) by 764 days.

(21) Appl. No.: 09/897,290

(22) Filed: Jun. 29, 2001

(65) Prior Publication Data

US 2002/0137476 A1    Sep. 26, 2002

(30) Foreign Application Priority Data

Mar. 22, 2001 (KR) ............................... 2001-14933

(51) Int. Cl.⁷ ........................... H04M 1/00; H04B 1/38

(52) U.S. Cl. ............................. 379/433.12; 455/575.4

(58) Field of Search ................. 379/433.12, 433.01, 379/433.02, 433.03; 455/575.1, 90.3, 575.4

(56) References Cited

U.S. PATENT DOCUMENTS 5,151,946 A     9/1992  Martensson
6,370,362 B1 *  4/2002  Hansen et al. ......... 379/433.12

FOREIGN PATENT DOCUMENTS

JP    HEI10-243065    9/1996
WO    WO 98/16047     4/1998

* cited by examiner

*Primary Examiner*—Jack Chiang
(74) *Attorney, Agent, or Firm*—Morgan & Finnegan, L.L.P.

(57) ABSTRACT

The present invention discloses a slide type mobile phone that allows a drastic shortening in length of its main body by making its upper housing and lower housing to slide, using slide module installed inside of the main body of the mobile phone, and comprises at least one slide module which combines the upper and lower housings with each other and enables the upper and lower housings to slide in straight line; and a connecting member which connects electrically the printed circuit board installed in the upper housing and the printed circuit board installed in the lower housing.

10 Claims, 11 Drawing Sheets

SLIDE TYPE MOBILE PHONE USING SLIDE MODULE

BACKGROUND OF THE INVENTION

1. Field of the Invention

The present invention generally relates to a slide type mobile phone and in particular to a mobile phone, in the main body of which a slide module is installed in order to enable the upper and lower housings to slide upon each other.

2. Description of the Prior Art

Recently, a mobile phone capable of providing wireless communication services has become a necessary in our society and various types of mobile phones are manufactured to comply with different tastes of different people (e.g., bar type, flip type, folder type, etc.).

A bar type mobile phone, since its keypad is exposed, can easily be damaged or the keypad can be pressed by mistake. A flip type mobile phone, although it was introduced to solve this problem and equipped with a flip to protect the keypad by covering it, shares another problem with the bar type mobile phone that its main body is still too long for convenient transport. Further, the flip type mobile phone fails to satisfy the demand for a larger display screen required for Internet access, etc.

Thus, a folder type mobile phone has been introduced to shorten the length of the main body of a bar type phone or a flip type phone. However, the hinges that connect the upper folder and the lower folder can easily be damaged because these folders have to be opened and closed repeatedly for every call.

A slide type mobile phone has been proposed for solving the above problem.

A conventional slide type mobile phone 100 as illustrated in FIGS. 1a and 1b, comprising a main body 111, and a slidable cover 112 capable of covering the keypad and the liquid crystal display (LCD) of the main body, can cover or expose the keypad and the LCD through sliding motion of the slidable cover 112.

FIG. 1a illustrates the slidable cover 112 as it covers the keypad and the LCD so that the slide type mobile phone 100 can be carried.

FIG. 1b illustrates as the slidable cover 112 slid to expose the keypad and the LCD so that the slide type mobile phone 100 can be used for communication.

Conventional slide type mobile phone 100 as aforementioned failed to shorten the length of the main body, even though the keypad and the LCD are covered with a slidable cover 112 for protection, by substitution of the flip part for the sliding part.

Conventional slide type mobile phone 200 as illustrated in FIGS. 2a and 2b comprises a main body 212 having a liquid crystal display 211 in an exposed position; and a sliding member 214 having a keypad 213 and being capable of insertion into the main body 212 by sliding.

FIG. 2a illustrates the sliding member 214 having the keypad 213 as it is slid inserted into the main body 212.

FIG. 2b illustrates the sliding member 214 as exposed for a phone call by using the keypad 213, after it is slid out from the main body 212 as in FIG. 2a.

As such, the conventional slide type mobile phone 200 as aforementioned, has a main body 212 which is substantially not shorter than that of a flip type mobile phone.

In this regard, another slide type mobile phone has been proposed, which has a main body comprising an upper housing and a lower housing, wherein the upper housing is made to slide upwards. In this type of mobile phone, however, the sliding part can be easily damaged by impact, etc. since the guide member for guiding the upper housing is made of rails, which are easily damageable.

Moreover, the above conventional slide type mobile phones are inconvenient for users in that the users cannot exactly see whether or not the mobile phone has been correctly opened or closed through by the motion of the slidable part.

SUMMARY OF THE INVENTION

Accordingly, the present invention, conceived to solve the aforementioned problems, aims to provide a mobile phone of which the main body can substantially be shortened in length by sliding of its upper and lower housings using slide module(s) installed inside of the main body.

It is another objective of the present invention, to provide a mobile phone which allows the user to feel completion of the opening or closing of the main body of the phone when the upper and lower housings are slid using the slide module, so that user can confirm whether the phone is correctly opened or closed through sliding motions.

In order to achieve the above objectives, a mobile phone in accordance with the present invention comprises at least one slide module that combines the upper and lower housings with each other and enables the upper and lower housings to slide on the straight; and a connecting member for electrically connecting a printed circuit board installed in the upper housing with that installed in the lower housing.

The present invention discloses a mobile phone comprising an upper housing having an LCD, and a lower housing having a keypad, wherein the upper and lower housings are made to slide through slide module(s) installed in the upper housing.

DESCRIPTION OF THE PREFERRED EMBODIMENTS

A description of the preferred embodiments of the present invention is given below making reference to the accompanying drawings, for a more clear understanding of the present invention.

Figure 1A:
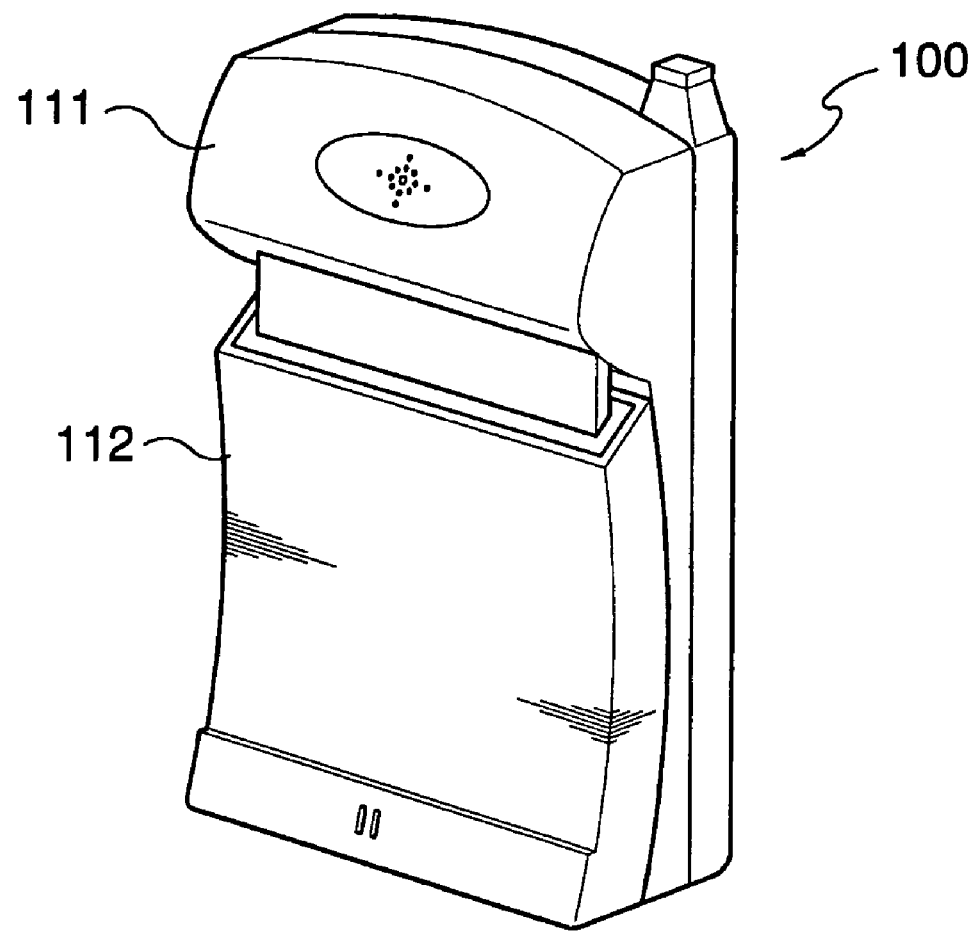
FIGS. 1a and 1b are elevational views of conventional slide type mobile phones.
Figure 1B:
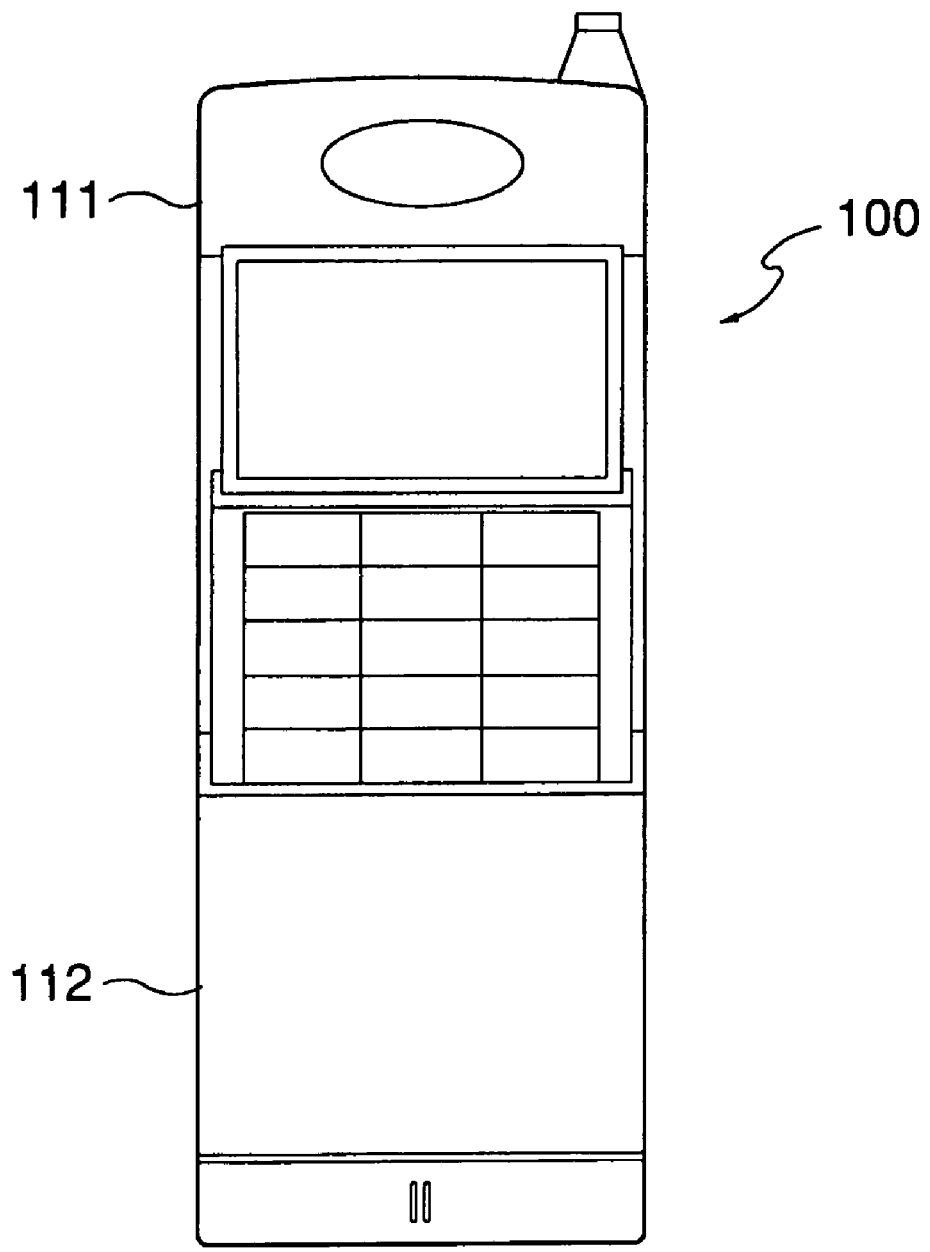
Figure 2A:
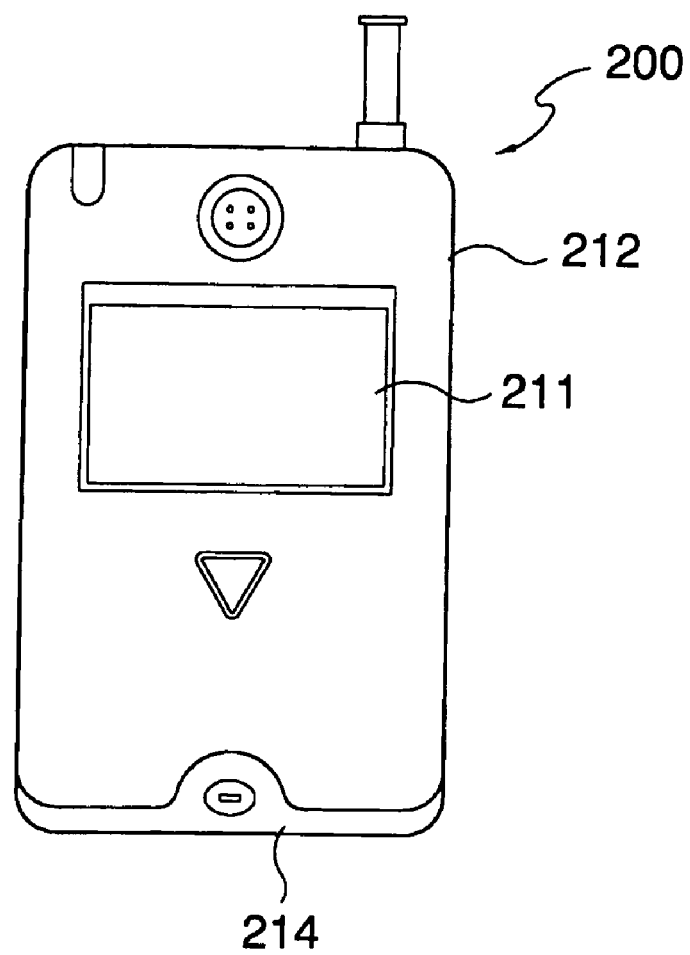
FIGS. 2a and 2b are elevational views of another conventional slide type mobile phone.
Figure 2B:
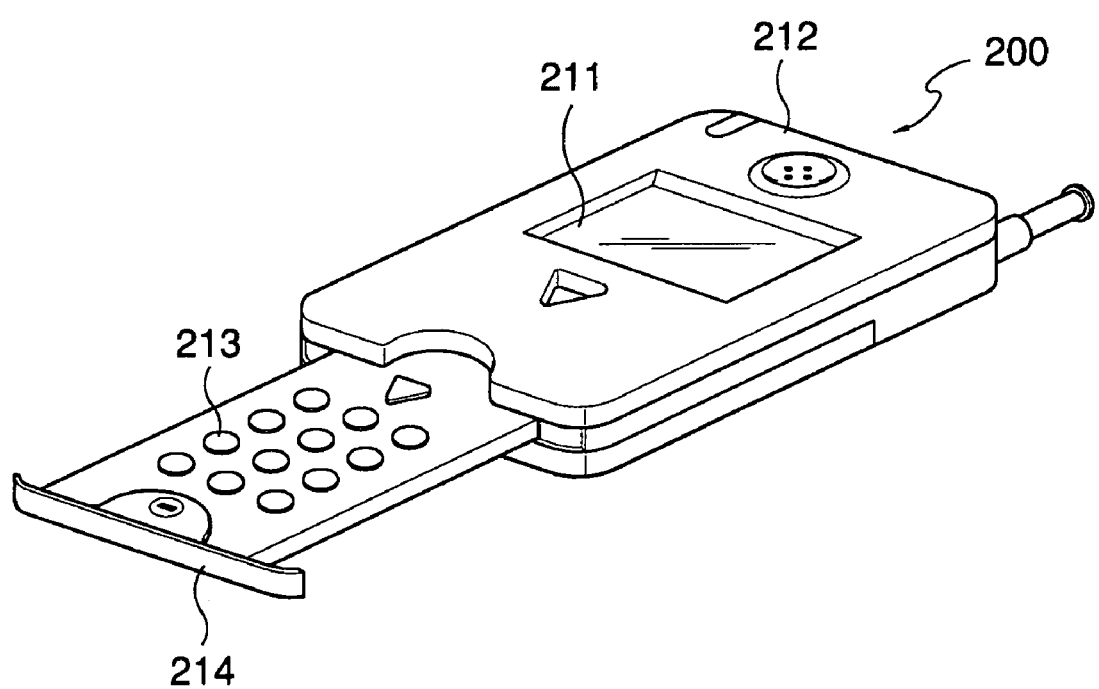
Figure 3:
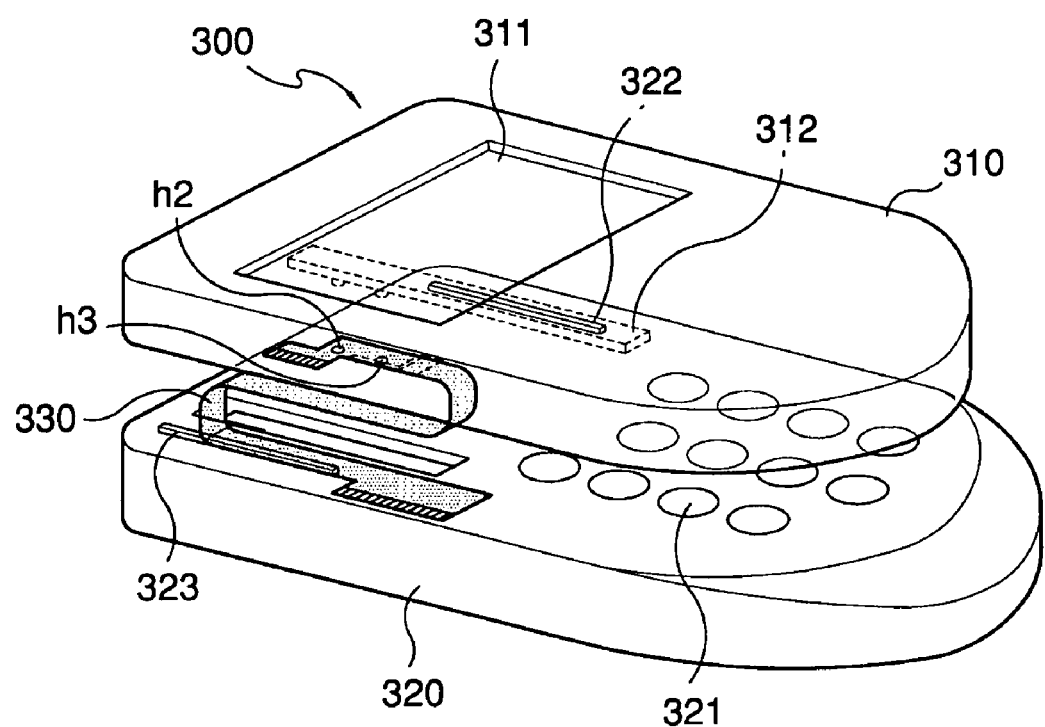
FIG. 3 is a perspective view of a slide type mobile phone using slide module(s) according to an embodiment of the present invention.

FIG. 3 is a perspective view of a slide type mobile phone using slide module(s) according to an embodiment of the present invention, wherein the slide type mobile phone comprises an upper housing 310 with slide module 312 and electronic components such as speaker, function keys, LCD 311, etc. attached thereto, and a lower module 320 with electronic components such as microphone, antenna, battery, keypad 321, etc. attached thereto.

The mobile phone 300 further comprises a FPCB (Flexible Printed Circuit Board) 330 for electrically connecting the printed circuit board which drives the electronic components installed in the upper housing 310 and the printed circuit board which drives the electronic components installed in the lower housing 320.

Further, by mounting function keys which control receiving of calls, a microphone, and a speaker in exposed positions, the mobile phone according to the present invention can be fit to receive a phone call without the need of opening the upper housing 310 and the lower housings 320.

In addition, the slide module 312 does not need to be embodied as a single module as in FIG. 3, but rather a plurality of slide modules can also be used to embody the mobile phone pursuant to the present invention.

Figure 4:
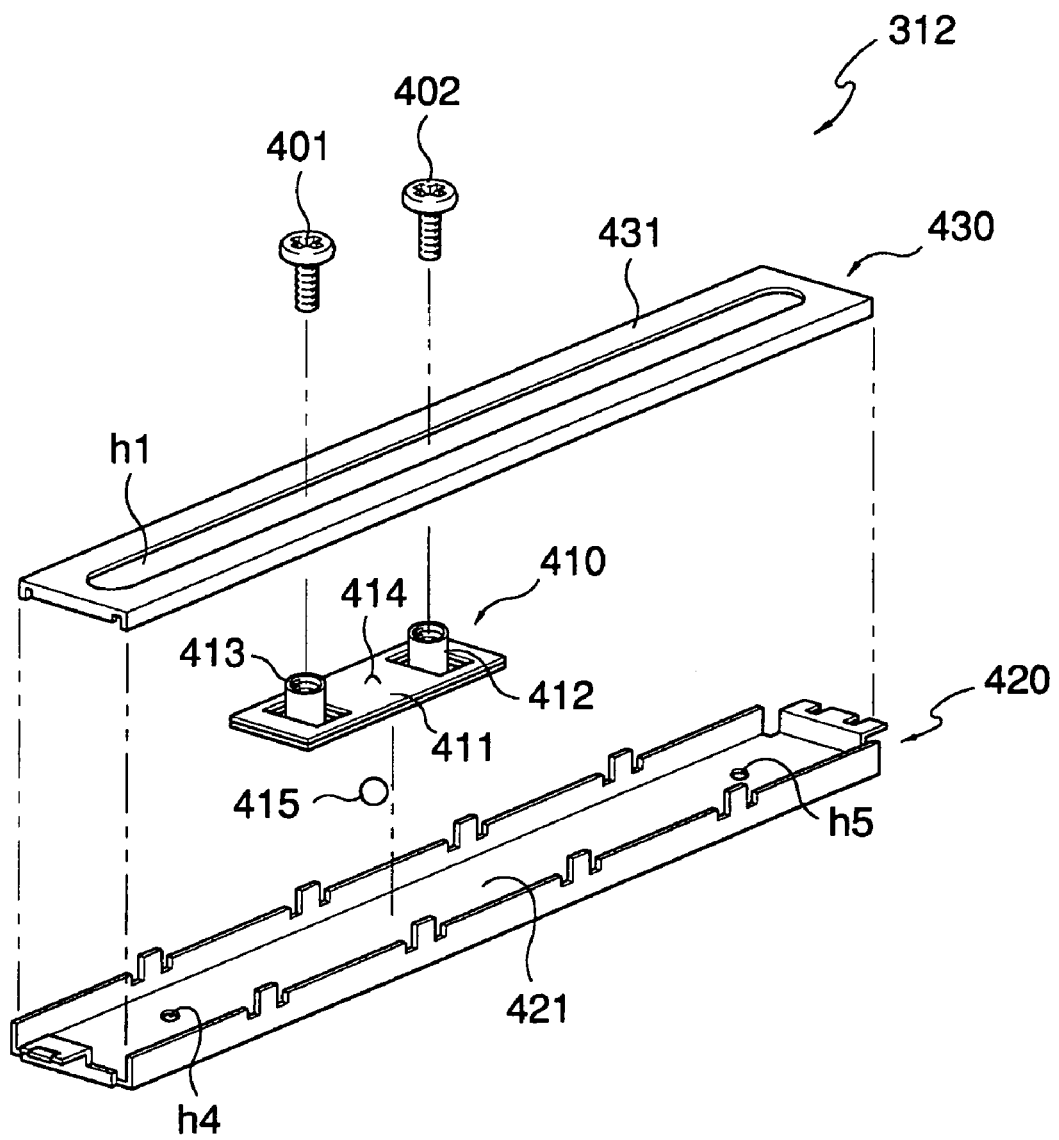
FIG. 4 is an exploded perspective view of a slide module according to the present invention.

FIG. 4 is a disjoined perspective view of the slide module as in FIG. 3. The slide module 312 includes sleeves 412, 413 for fixing the lower housing 320 to the slide module 312; a sliding member 410 which enables sliding of the upper housing 310 and the lower housing 320; a support plate 420 which is attached to the upper housing 310 for supporting the sliding member 410; and a guide plate 430 in which the sliding member 410 is fixed attached to the support plate 420 and a guide hole h1 is formed for guidance of sliding of the sliding member 410.

The sliding member 410 comprises a plate spring 411 which is supported on the support plate 420 by the guide plate 430 in a slidable manner; the first and the second sleeves 412, 413 each of which separately penetrates the plate spring 411 vertically and protrudes toward the guide plate 430 for fixing the lower housing 320 to the slide module 312; and a protrusion 414 which is formed by protrusion of a predetermined part of the plate spring 411 between the first and the second sleeves 412, 413 for insertion of a ball 415 between the plate spring 411 and the support plate 420.

Here, the plate spring 411 shall be made of material having low abrasion so that wear of the sliding member 410 due to the sliding friction would be minimized.

Further, the first and the second sleeves 412, 413 have screw grooves for insertion of screws 401, 402. By inserting the screws 401, 402 into the above screw grooves after connection of the first and the second sleeves 412, 413 respectively to holes h2, h3 formed in the lower housing 320 as in FIG. 3, the lower housing 320 can be combined to the slide module 312 which is attached to the upper housing 310.

The support plate 420 has a hexahedral shape with one face opened. To be more specific, the support plate 420 is formed of a rectangular bottom face 421 with which the plate spring 411 is contacted; and four vertical walls which are all equally high above from the rectangular bottom face 421. Here, the four walls are higher than the thickness of the plate spring 411 and lower than the height of the first and the second sleeves 412, 413. In this manner, the first and the second sleeves 412, 413 can have enough length for holes h2, h3 in the lower housing to be inserted therein when the sliding member 312 is placed on the support plate 420 by the guide plate 430.

Further, the prominences and depressions formed in the wall of the support plate 420 are vertically folded in along the direction of combination of the guide plate 430 when the guide plate 430 is combined with the support plate 420. Such arrangement is for a firmer combination of the support plate 420 with the guide plate 430.

Further, two holes h4, h5 are separately formed in the bottom face 421 of the support plate 420 so that the ball 415 can be locked therein at the time of sliding of the sliding member 410. For example, when the ball 415 is locked in holes h4, h5, the user can feel such locking. In this way, he can confirm completion of the sliding for opening or closing of the upper and lower housings 310, 320.

The guide plate 430 is a hexahedral plate with one face opened similar to the support plate 420. The guide plate 430 comprises a rectangular plane 431 with a guide hole h1 formed in the center part thereof; and four vertical walls which are all equally high from above the rectangular plane 431. Here, the walls, having almost the same height as that of the walls of support plate 420, are inserted into the support plate 420 at the time of assembling the slide module 312, with the external sides of the walls of the guide plate 430 contacting the internal sides of the walls of the support plate 420.

Further, the rectangular plane 431 of the guide plate 430 has a predetermined width for separating the walls from the guide hole h1. Such a width secures sufficient guide space wherein the sliding member 410 of the slide module 312 can slide along.

Figure 5:
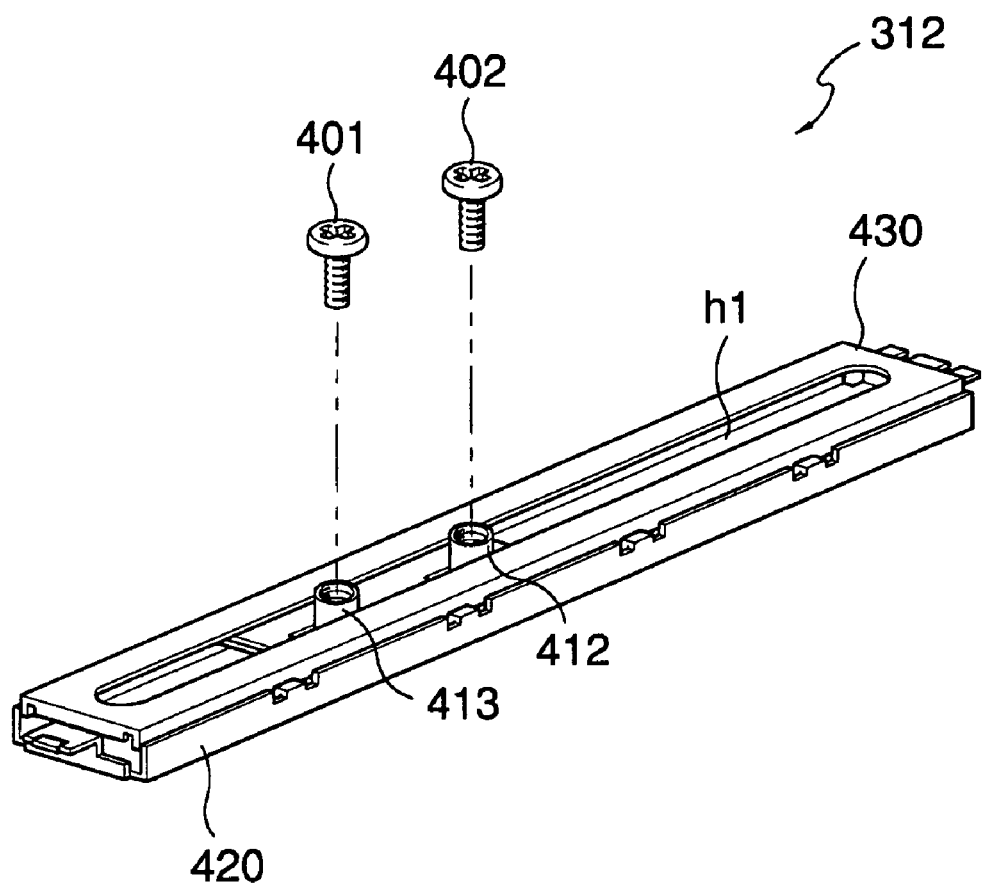
FIG. 5 is a combined perspective view of the slide module according to the present invention.

FIG. 5 is a perspective view of the slide module as in FIG. 4 as combined.

With the slide module 312 combined as in FIG. 5, holes h2, h3 of the lower housing 320 are inserted into the first and the second sleeves 412, 413 that are protruded through the guide plate 430 and then the lower housing 320 is fixed using screws 402, 401 to slide the module 312 that is attached to the upper housing 310.

In this way, the sliding member 410 is made to slide along the guide hole h1 of the guide plate 430 in the above guide space with the slide module 312 combined. That is, the upper and lower housings 310, 320 which are combined with each other by the slide module 312 can be made to slide through the sliding member 410 which latter moves along the guide hole h1.

Figure 6:
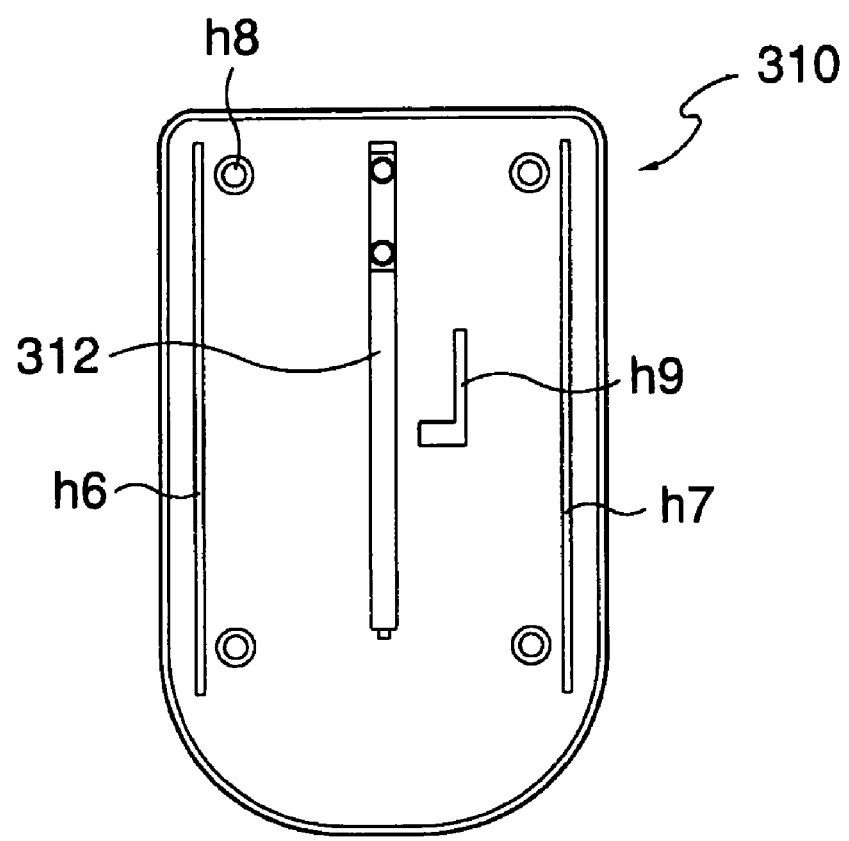
FIG. 6 is a sectional view of the upper housing as in FIG. 3.

FIG. 6 is a bottom view of the upper housing as in FIG. 3.

In FIG. 6, the figure numerals h6 and h7 indicate bar type grooves into which bar type rails 322, 323 protruded on both edges of the lower housing 320 as in FIG. 3 are inserted respectively. In this way, a straightforward linear sliding is enabled between the upper and lower housings 310, 320 when the mobile phone 300 is opened or closed.

Accordingly, a rattle or twist between the upper housing 310 and the lower housing 320 can be avoided when the upper and lower housings 310, 320 are slid to open or close the mobile phone.

Figure numeral h8 indicates a hole for insertion of a screw and the "L"-shaped hole h9 is for insertion of a FPCB 330. Here, the FPCB 330 that is inserted through h9 is electrically connected to the printed circuit board in the upper housing 310.

Figure 7:
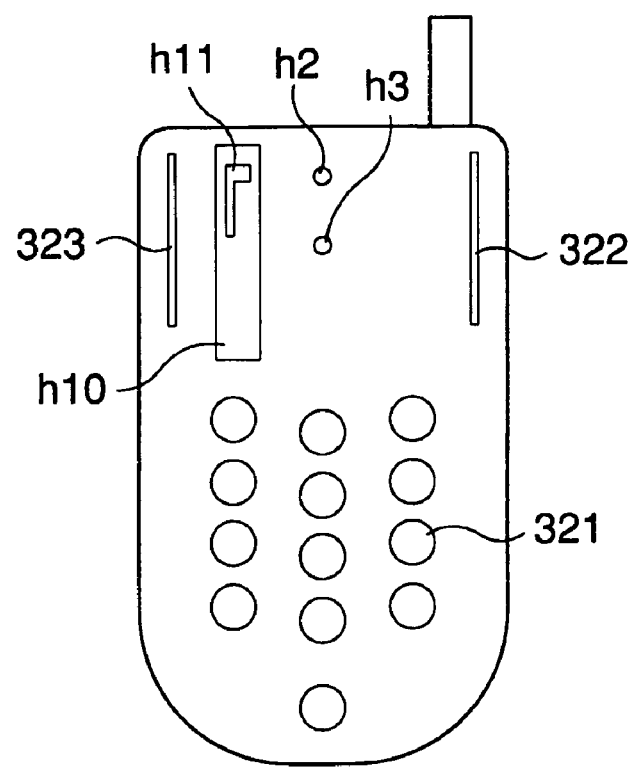
FIG. 7 is a sectional view of the lower housing as in FIG. 3.

FIG. 7 is a plane view of the lower housing as in FIG. 3.

In FIG. 7, figure numeral h10 indicates a hole for insertion of FPCB 330 which electrically connects the printed circuit boards in the upper and lower housings 310, 320.

Inside the hole h10, an "L"-shaped hole h11 is formed, through which the FPCB 330 is electrically connected to the printed circuit board of the lower housing 320.

As described above, by insertion of the FPCB 330 into h10 when combining the upper and lower housings 310, 320, a failure in combination caused by thickness of the FPCB 330 can be prevented.

Figure 8:
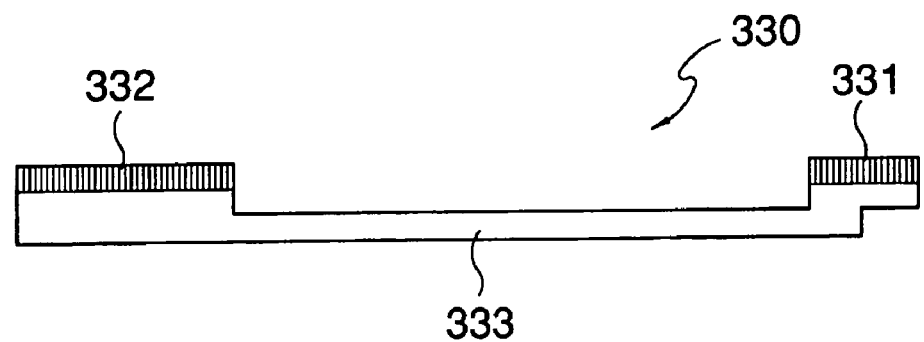
FIG. 8 is a sectional view of FPCB as in FIG. 3.

FIG. 8 shows a cross-sectional view of the FPCB 330 as in FIG. 3.

Referring to FIG. 8, the first terminal 331 from FPCB 330 is connected to the printed circuit board after being inserted into h9 of the upper housing 310 and the second terminal 332 is connected to the printed circuit board after being inserted into h11 of the lower housing 320.

The connection cord 333 which is an electric wire linking the first and the second terminals 331, 332 is inserted into h10 of the lower housing 320 at the time of combining the upper and lower housings 310, 320.

Figure 9A:
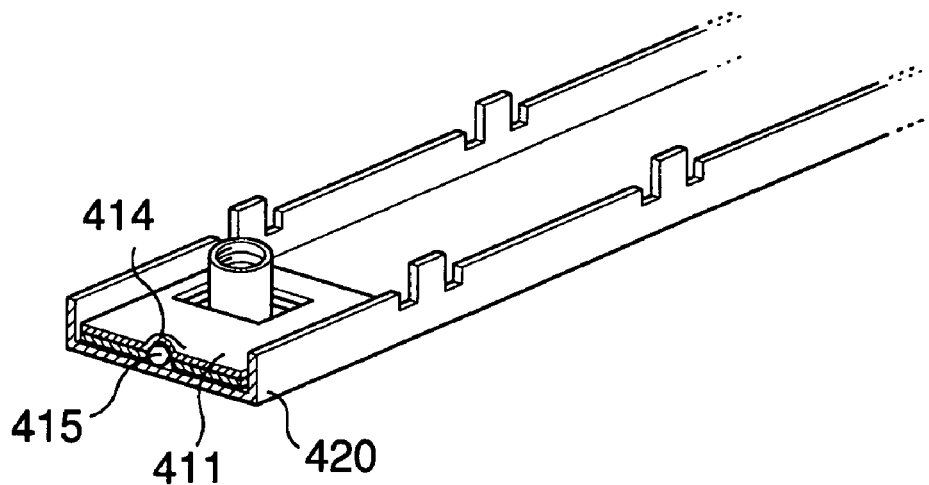
FIGS. 9a through 9c are sectional views showing installation of the ball as in FIG. 4.

FIG. 9a shows contact of the ball 415 with the bottom face 431 of the support plate 420 at the time of combining the support plate 420 with the sliding member 410 as in FIG. 4.

Figure 9B:
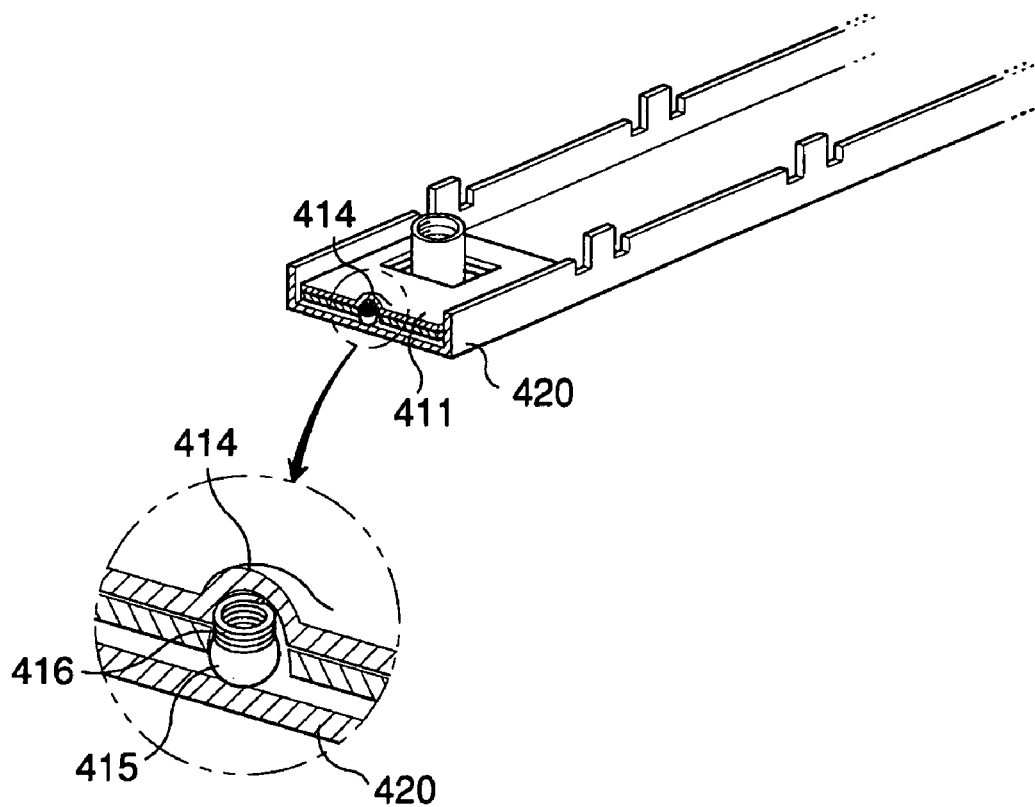
Figure 9C:
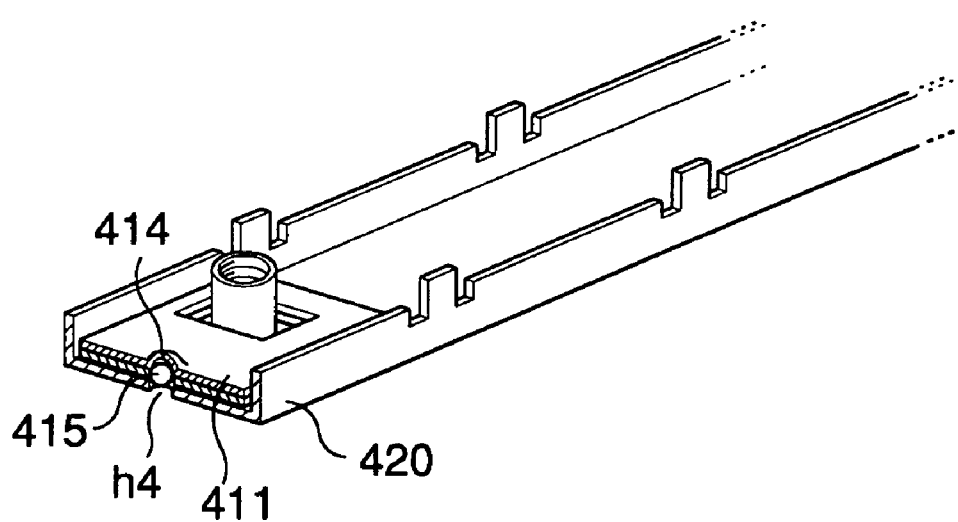

FIG. 9b shows contact of the ball 415 with the bottom face 431 of the support plate 420 at the time of combining the support plate 420 with the sliding member 410 as in FIG. 4 but differs from FIG. 9a in that the sliding member 410 has a spring 416 inserted between the protrusion 414 and the ball 415.

The spring 416 is employed to generate a louder "clicking" sound from locking of the ball 415 into holes h4, h5 of the support plate 420 at the time of sliding of the sliding member 410, so that the user can better confirm the completion of sliding for opening or closing of the upper and lower housings 310, 320.

However, since the plate spring 411 has a longitudinal elasticity, the user can feel completion of sliding by opening or closing of the upper and lower housings 310, 320, even with a sliding member 410 having no spring 416.

Although the mobile phone according to the present invention is described with a manual sliding part between the upper housing 310 and the lower housing 320, the sliding for opening or closing of the upper and lower housings 310, 320 can also be made in full automatic manner. Further, the mobile phone according to the present invention can also be embodied half-automatically, i.e. in a manner that either one of the opening sliding or the closing sliding is made automatically at the time of opening or closing the upper and lower housings 310, 320.

Although the present invention has been described above with reference to preferred embodiments, it should be noted that these embodiments serve not for limitation but merely for explanation of the present invention, and it will be understood by those skilled in the art that various changes may be made without departing the spirit and scope of the present invention.

As described above, the present invention provides the following advantageous effects by embodying a mobile phone using slide module:

first, marketability of a mobile phone can be enhanced by substantively shortening the length of its main body;

second, the user can feel completion of the sliding at the time of opening or closing the upper and lower housings, so that he can better confirm that the mobile phone has been opened or closed correctly; and third, since sliding between the upper and lower housings is made linearly using bar type rails, a rattle or twist of the mobile phone can be prevented.

What is claimed is:

1. A slide type mobile phone having an upper housing and a lower housing, wherein said mobile phone comprises:
at least one slide module that combines said upper and lower housings with each other and allows said upper and lower housings to slide in straight line; and
a connecting member that electrically connects a printed circuit board installed in said upper housing to a printed circuit board installed in said lower housing,
wherein said at least one slide module comprises a sliding member; a support plate which is fixed to said upper housing for supporting said sliding member; and a guide plate which supports said sliding member together with said support plate and has a guide hole formed therein to guide sliding of said sliding member,
wherein the sliding member comprises first and second sleeves for combining itself with said lower housing, and enables said upper and lower housing to slide.

2. The slide type mobile phone as set forth in claim 1, wherein said sliding member comprises a plate spring attached to said support plate by said guide plate; said first and second sleeves which separately penetrate vertically said plate spring and protrude toward said guide plate for fixing said lower housing to said slide module; and a protrusion which is formed by protrusion of predetermined part of said plate spring between said first and second sleeves for insertion of a ball in between said plate spring and said support plate.

3. The slide type mobile phone as set forth in claim 2, wherein each of said first and second sleeves has screw groove for insertion of screw for fixing said lower housing.

4. The slide type mobile phone as set forth in claim 1, wherein said support plate has a hexahedral shape with one face opened, said hexahedral shape comprising four vertical walls and a bottom face attached to said lower housing, and a first hole and a second hole are formed separately in said bottom face so as to generate a "click" sound by locking of said ball into said holes when said upper and lower housings slide.

5. The slide type mobile phone as set forth in claim 1, wherein said guide plate has a hexahedral shape with one face opened, said hexahedral shape comprising four vertical walls and a plane in the center of which a guide hole is formed to guide sliding of said sliding member.

6. The slide type mobile phone as set forth in claim 1, wherein a guide space is provided between said guide plate and said support plate when said sliding member is attached to said support plate using said guide plate so that said sliding member can be slid in said guide space.

7. The slide type mobile phone as set forth in claim 1, wherein said connecting member is a FPCB (Flexible Printed Circuit Board) which comprises the first and the second terminals that are connected to the printed circuit boards of said upper and lower housings, respectively; and connection wire that electrically connects said first and second terminals.

8. The slide type mobile phone as set forth in claim 7, wherein said lower housing has a groove for insertion of said connection wire of FPCB.

9. The slide type mobile phone as set forth in claim 2, wherein a spring is inserted between said protrusion and said ball.

10. The slide type mobile phone as set forth in any one of claims 1 through 9, wherein a first bar type rail and a second bar type rail are formed on both edges of said lower housing and the linear-shaped first and second holes are formed on both edges of said upper housing for insertion of said first and second rails to keep balance in sliding, by maintaining a straightforward linear sliding between said upper and lower housings.

* * * * *